US008443596B2

(12) United States Patent
Ramm

(10) Patent No.: US 8,443,596 B2
(45) Date of Patent: May 21, 2013

(54) HYDRAULIC DRIVE WITH AN INDEPENDENT CHARGE PUMP

(75) Inventor: Frank Ramm, Flintbek (DE)

(73) Assignee: Sauer Danfoss Inc., Ames, IA (US)

( * ) Notice: Subject to any disclaimer, the term of this patent is extended or adjusted under 35 U.S.C. 154(b) by 824 days.

(21) Appl. No.: 12/615,412

(22) Filed: Nov. 10, 2009

(65) Prior Publication Data

US 2010/0293937 A1 Nov. 25, 2010

(30) Foreign Application Priority Data

May 19, 2009 (DE) ........................ 10 2009 021 866

(51) Int. Cl.
*F16D 31/02* (2006.01)

(52) U.S. Cl.
USPC ............................................... 60/329; 60/431

(58) Field of Classification Search
USPC ............................ 60/488, 464, 456, 431, 329
See application file for complete search history.

(56) References Cited

U.S. PATENT DOCUMENTS

| | | | | |
|---|---|---|---|---|
| 5,944,159 | A * | 8/1999 | Schneider et al. | 192/85.63 |
| 6,739,127 | B2 * | 5/2004 | Nippert et al. | 60/414 |
| 7,610,754 | B2 * | 11/2009 | Ochi et al. | 60/428 |
| 2008/0238187 | A1 * | 10/2008 | Garnett et al. | 303/112 |

FOREIGN PATENT DOCUMENTS

| | | | |
|---|---|---|---|
| DE | 4111921 | A1 | 10/1992 |
| DE | 19930997 | A1 | 5/2000 |
| DE | 10037195 | A1 | 2/2002 |
| DE | 10214598 | A1 | 10/2003 |
| DE | 10238614 | A1 | 2/2004 |

* cited by examiner

*Primary Examiner* — Edward Look
*Assistant Examiner* — Logan Kraft
(74) *Attorney, Agent, or Firm* — Zarley Law Firm, P.L.C.

(57) ABSTRACT

The invention relates to a hydraulic drive (2) having a main pump (8), which can be adjusted in terms of delivery volume and delivery direction, and having a hydraulic motor (9), which main pump (8) and hydraulic motor (9) are connected to one another in a closed circuit via pressure lines (10A, 10B), and having a charge pump (14, 15) for charging into the closed circuit and for supplying pressurized fluid to at least one controlling device (11, 12), wherein the charge pump (15) has a separate drive motor (19) whose power/rotational speed can be specified independently of the rotational speed of the drive (3) of the main pump (8). In this way, the charge pump (15) can be of smaller dimensions than previously conventional, and the power balance of the hydraulic drive can be improved.

11 Claims, 2 Drawing Sheets

HYDRAULIC DRIVE WITH AN INDEPENDENT CHARGE PUMP

BACKGROUND OF THE INVENTION

The invention relates to a hydraulic drive having a main pump, which can be controlled in terms of delivery volume and delivery direction, and having a hydraulic motor, which main pump and hydraulic motor are connected to one another in a closed circuit via pressure lines, and having a charge pump for charging into the closed circuit and for supplying pressurized fluid to at least one control device, as per the preamble of Claim 1.

A hydraulic drive of said type is known from DE 102 14 598 A1. Similar hydraulic drives are also described in documents DE 41 11 921 C2, DE 102 38 614 A1, DE 199 30 997 B4 and DE 100 37 195 A1. In such hydraulic drives, the charge pump has the function of providing pressurized fluid for the actuation of the control devices at least for the main pump and/or the variable displacement motor, and of compensating oil losses as a result of leakages in the closed circuit. The charge pump must be dimensioned for this purpose such that it maintains a certain low pressure level, usually in the range of 20-25 bar, under all circumstances. The charge pump is therefore designed such that said pressure level is obtained even at the lowest rotational speed of the drive. The power required for this can be up to 20% of that of the main pump, and is therefore considerable.

In said known drives, the charge pump is mechanically coupled to the main pump at all times and is driven together with the latter by the same internal combustion engine. The rotational speed of said drive is predefined by the rotational speed of the internal combustion engine, such that the delivery volume of the non-adjustable charge pump is dependent on, and fluctuates with, the engine rotational speed. Since the charge pump must provide a predefined minimum pressure in all rotational speed ranges, said charge pump must be of such large dimensions that it builds up a sufficient pressure even at a minimum rotational speed of the internal combustion engine. As a result, the charge pump is overdimensioned at relatively high rotational speed and delivers more pressurized fluid than is necessary. Said excess pressurized fluid is, according to the prior art, dissipated via pressure limiting valves and the energy contained therein is converted into waste heat. This leads to considerable power losses in the drive system, in particular at relatively high rotational speeds of the drive. Furthermore, coolants are required for dissipating the heat energy, which entails an increased material expenditure in the cooling system of the hydraulic machine.

In DE 102 38 614 A1, it is proposed, to avoid such losses, for the charge pump to be assisted in the low rotational speed range of the internal combustion engine by means of the provision of additional pressurized fluid by a further pump. Said further pump serves primarily for the supply to separate working hydraulics and is disconnected from the charge pressure circuit by means of a control valve at relatively high rotational speeds of the internal combustion engine. Although the charge pump itself can hereby be of smaller dimensions than previously conventional, said solution does however entail increased expenditure in terms of components and control measures.

The invention is therefore based on the object of creating a hydraulic drive of the type specified in the introduction in which the energy losses are considerably reduced in relation to the prior art and which can be realized with little expenditure.

SUMMARY OF THE INVENTION

Said object is achieved according to the characterizing part of Claim 1 in that the charge pump has a separate drive motor whose power and/or rotational speed can be specified independently of the rotational speed of the drive of the main pump.

The separate drive for the charge pump makes it possible for the pressure in the charge pressure circuit to be controlled according to the present demand and to therefore be independent of the operation of the internal combustion engine and of the main pump. Accordingly, the charge pump provides a sufficient volume flow of pressurized fluid at all times, even at low rotational speeds of the internal combustion engine and generally over the entire working range of the hydraulic machine. Said volume flow is at least approximately constant over the entire working range of the hydraulic machine and is in particular not dependent on the rotational speed of the internal combustion engine. The charge pump can therefore be of optimum design, which in physical terms means that it can be of significantly smaller design and have a lower power than is necessary in the prior art. The reduction in the power demand of the drive according to the invention of the charge pump leads to a corresponding improvement in the power balance of the hydraulic drive. Since no excess pressure must be dissipated in the charge pressure circuit, no unnecessary waste heat is generated here. This results in an advantageous reduction in cooler size and in coolant demand.

One preferred refinement of the hydraulic drive may involve the drive motor being designed as a controllable electric motor with a separate voltage supply. The voltage for operating the electric motor may advantageously be provided by the alternator, the battery or generally by the voltage supply of the appliance which is fitted with the hydraulic drive. An on-board voltage supply is always provided in relevant hydraulic drives which are used for example in mobile working machines, since such on-board voltage supplies are imperatively necessary for the operation of the internal combustion engine and the driving electronics.

The electric motor is controlled by means of electronics which are preferably integrated into the driving electronics of the hydraulic drive. The electronics may also be independent of the driving electronics. The electronics receive signals from a pressure sensor which is arranged on the high-pressure side of the charge pump and which determines the pressure generated by the latter. The electric motor is accordingly activated in such a way that the charge pump provides at all times a sufficient, preferably constant pressure for the operation of the hydraulic drive. The operation of the charge pump, in particular the volume flow and pressure generated by the latter, is hereby completely independent of the rotational speed and the power demands of the internal combustion engine. The charge pump can therefore reliably provide the required charge pressure in all operating states of the hydraulic drive. Here, it is to be considered a particular advantage that the charge pump always generates only the pressure and volume flow which is presently required, such that no components or control measures are required for dissipating excess pressurized fluid. In this way, all losses resulting from the overdimensioning of the charge pump, which is necessary according to the prior art, are eliminated.

Within the context of the invention, it is possible as a drive motor to use any desired drives, with electric drives being preferable. Electric motors can be controlled in terms of their rotational speed preferably by means of activating electronics and are coupled to the charge pump directly or via a gearing. A change in the rotational speed effects a change in the volume flow delivered by the pump and therefore a corresponding change in the pressure generated at the outlet side.

A change in the volume flow, that is to say in the volume of pressurized fluid delivered per unit time, and therefore a possibility of controlling the pressure generated by the charge pump, can also be obtained by virtue of the delivery volume of the charge pump being adjustable. When using an axial piston pump, this can be obtained for example by virtue of the piston stroke being controlled. In this way, it is possible, for a constant rotational speed of the drive motor, to carry out control of the volume flow of the charge pump, for which purpose it is of course necessary to provide a device for adjusting the delivery volume. Said device is advantageously activated by the electronic controller of the hydraulic drive.

As charge pumps, use is preferably made of pumps whose delivery volume and pressure build-up can be determined by controlling their drive. Suitable examples include external gear pump, internal gear pump, gerotor pump, roller vane pump, vane-type pump or axial piston pumps.

The invention is explained in more detail below on the basis of an exemplary embodiment illustrated in FIG. 2.

DETAILED DESCRIPTION OF THE PREFERRED EMBODIMENTS

Figure 1:
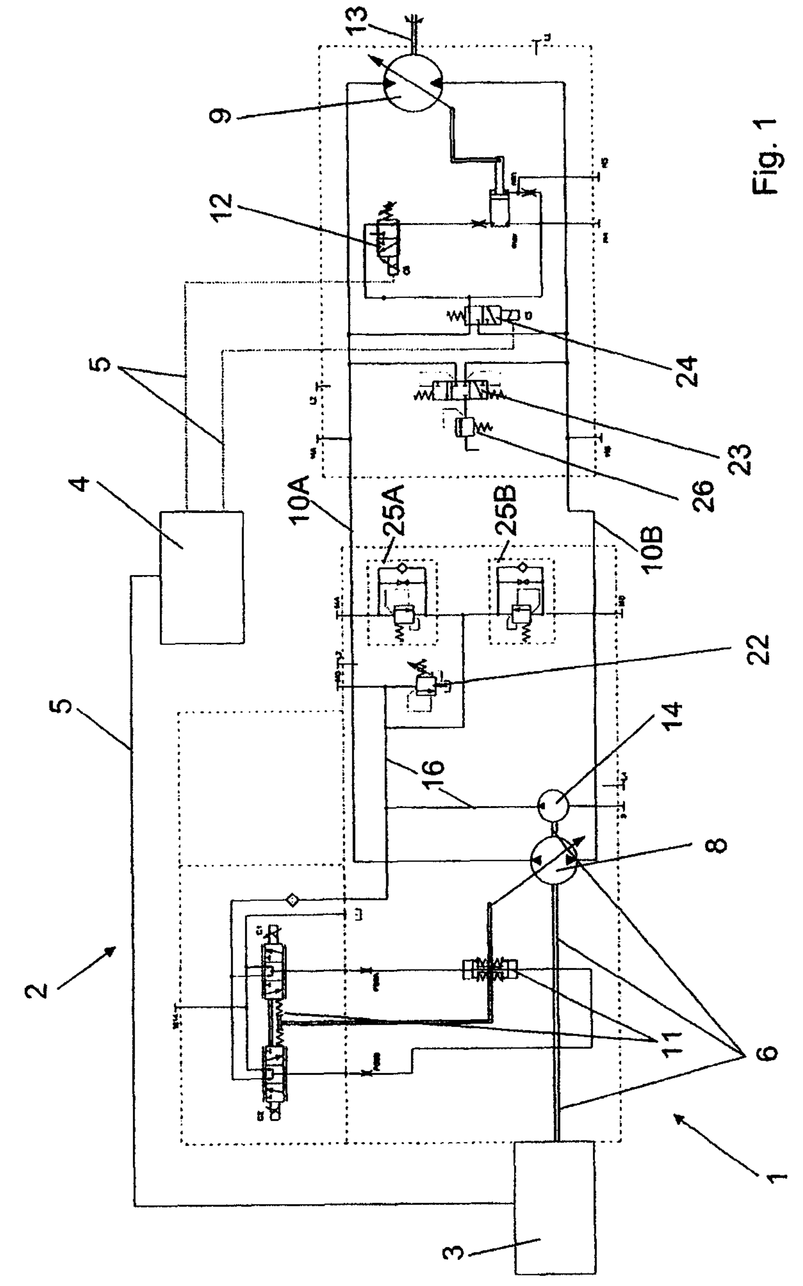
Fig. 1 Prior art
FIG. 1 shows a schematic illustration of a traction drive having a hydraulic drive according to the prior art.

FIG. 1 illustrates, in a schematic view, a traction drive 1 having a hydraulic drive 2 according to the prior art. An internal combustion engine 3, usually a diesel engine, serves as a drive for the hydraulic drive 2 and is connected to the electronics 4, in this case driving electronics, via electric signal lines 5. The drive output shaft 6 of the internal combustion engine 3 drives the main pump 8 of the hydraulic drive 2 directly or via a step-up gearing (not shown). Said main pump 8 is connected in a closed circuit, via pressure lines 10A and 10B, to the hydraulic motor 9, illustrated here as a variable displacement motor. The main pump 8 can be adjusted in terms of delivery volume and delivery direction by means of the mechanical-hydraulic servo adjusting arrangement 11, which adjustment takes place according to driving demands which are input into the electronics 4 by the operator of the traction drive 1. The electronics 4 also acts on the motor adjusting arrangement 12 of the hydraulic motor 9 and thereby changes the displacement thereof according to the driving demands. The hydraulic motor 9 has a drive output shaft 13 by means of which for example the wheels of a mobile working machine can be driven.

Arranged adjacent to the main pump 8 is the charge pump 14 which is likewise driven by the drive output shaft 6 of the internal combustion engine 3. The delivery rate and the pressure build-up of the charge pump 14 according to the prior art are therefore directly dependent on the rotational speed of the internal combustion engine. At the output side of the charge pump 14, pressure lines 16 lead to different consumers, such as to the servo adjusting arrangement 11 of the main motor 8 and to in each case one combination valve 25A and 25B. The combination valves 25A, 25B are in each case connected at the output side to the associated pressure line 10A and 10B respectively of the closed circuit. Said combination valves 25A, 25B serve firstly to safeguard the pressure in the entire system, for which purpose in each case one of the partial valves opens at approximately 400 bar, and secondly, said combination valves 25A, 25B provide a supply of pressurized fluid from the charge pump 14 to the respective low-pressure side of the closed circuit between the main pump 8 and the hydraulic motor 9. In this way, it is obtained that the required low-pressure value is maintained at all times on the low-pressure side, with pressurized fluid losses in the closed circuit being compensated. Such losses are generated during operation of the hydraulic drive 2 inter alia as a result of practically unavoidable leakages or the dissipation of pressurized fluid through overpressure limiting valves into the tank for pressurized fluid.

Arranged in a branch at the output side of the charge pump 14 is the charge pressure limiting valve 22 which is set to the desired charge pressure to be maintained at all times. Said pressure is usually 20-25 bar. If said pressure is exceeded, then the charge pressure limiting valve 22 opens and conducts the excess pressurized fluid, with a release of pressure, into the tank for pressurized fluid.

During operation of the charge pump 14 according to the prior art, the rotational speed of the internal combustion engine 3 and therefore the pressure generated by the charge pump 14 increase proportionally if the hydraulic drive 2 is operated approximately at full load. The pressure which is generated in this way on the high-pressure side of the charge pump 14 is therefore significantly higher than the desired charge pressure, for which reason the charge pressure limiting valve 22 opens. During the pressure dissipation which is thereby effected, a considerable quantity of energy must be dissipated; this quantity of energy is manifested in intense heating of the pressurized fluid and must therefore be dissipated via coolant. At the high motor rotational speeds in working operation of the hydraulic drive 2, this leads to considerable power losses in the system, and to increased cooling expenditure.

The hydraulic motor 9 is assigned a high-pressure shuttle valve 24 which can be activated by the driving electronics, in this case in the electronics 4, and serves to define the direction of travel of the mobile working machine (not shown here). Also provided is a purge valve 23 between the pressure lines 10A and 10B, and also a scavenging pressure limiting valve 26. A small quantity of pressurized fluid is extracted from the closed circuit between the main pump 8 and the hydraulic motor 9, and is supplied to the tank via said valves at all times. This also constitutes a loss of pressurized fluid in the closed circuit, which pressurized fluid must be replaced by the charge pump 14.

Figure 2:
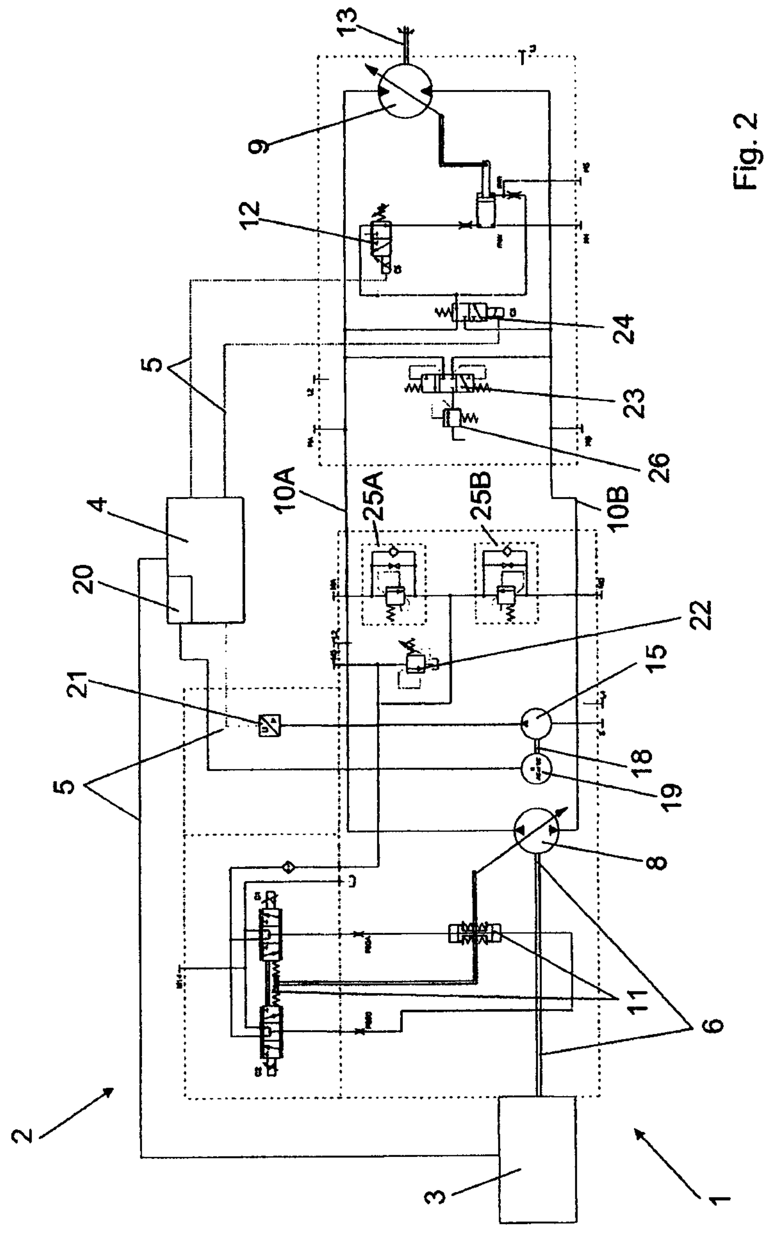
FIG. 2 shows a schematic illustration of a hydraulic drive having a charge pump according to the invention.

FIG. 2 shows a traction drive 1 with a hydraulic drive 2 according to the invention. Similar components are provided with the same reference signs as in FIG. 1 and self-evidently have the same functions as in the traction drive according to FIG. 1, for which reason a repetition of corresponding explanations is omitted.

In the exemplary embodiment illustrated in FIG. 2, the main difference with respect to the prior art is that an electric charge unit 18 which is independent of the internal combustion engine 3 is provided instead of a charge pump which is coupled to the main pump 8. Said charge unit 18 is composed of a drive motor 19 which directly drives the charge pump 15. Said drive motor 19 is preferably an electric motor which may be embodied as a direct-current or alternating-current motor. The drive motor 19 has a separate power source, the voltage supply 20, the operation of which can be controlled by means of the electronics 4. Furthermore, a pressure sensor 21 is arranged at the outlet side of the charge pump 15, in this case on the pressure line 16, which pressure sensor measures the pressure in the pressure line and transmits a corresponding signal via a line to electronics 4, in this case the driving electronics. The electronics 4 compares the signal with predefined values and, as a function of this, generates control signals which act on the controller of the drive motor 19. The rotational speed of said drive motor 19 is regulated in such a way that the desired charge pressure is generated at the pressure sensor 21 without an activation of the charge pressure limiting valve 22. Said valve has merely the function of a safety valve in the charge pump circuit.

By means of said drive of the charge pump 15 according to the invention, it is possible for all operating ranges of the hydraulic drive 2 to ensure a sufficient pressure or volume flow of the pressurized fluid in the charge circuit at all times. Here, the rotational speed of the charge pump and the volume flow generated by the latter are approximately constant and independent of the rotational speed of the drive of the main pump 8, since the consumers or leakages which are dependent on the charge pump are, at least as a first approximation, independent of the rotational speed of said drive. In this respect, it is possible to refer to this as a constant flow charge pump.

Fluctuations in consumption in the charge pump circuit which occur during operation are compensated by relatively small changes in rotational speed of the drive motor 19 of the charge pump 15. A change in the rotational speed of the drive motor 19 can also advantageously be brought about here if the temperature in the closed circuit becomes too high. Said temperature is determined, and transmitted as a signal to the electronics 4, by means of a temperature sensor (not shown). The electronics 4 compares said value with predefined values and determines whether a certain value has been exceeded. If this is the case, the electronics acts on the voltage supply 20 of the drive motor 19 so as to generate an increase in rotational speed. In this way, the oil exchange in the circuit of the hydraulic drive 2 is increased, which contributes to cooling of the pressurized fluid.

It is of course also possible to operate the drive motor 19 of the charge pump 15 at constant rotational speed and, for this purpose, to provide a voltage supply 20 with a fixed voltage. This results in a reduced expenditure on control measures and on required components, but at the expense of flexibility. In said variant, however, the control of the volume flow of the charge pump 15 and therefore of the outlet-side pressure can be obtained by virtue of the delivery volume of the charge pump 15 per working stroke, being controlled, which is for example with axial piston pumps or diaphragm pumps by means of a variable stroke volume adjustment.

FIG. 2 shows merely that the charge pump 15 supplies pressurized fluid via the pressure line 16 only to the servo adjusting arrangement 11 of the main pump 8. It is of course possible within the context of the invention for the charge pump 15 to also provide pressurized fluid to other connected control devices, for example the motor control arrangement 12 of the hydraulic motor 9, or to further consumers which are not supplied directly by the main pump 8. This also includes the possible compensation of leakages which may occur at various points of the hydraulic drive 2. It is thus possible within the context of the invention for the charge pump 15 to also charge partial flows of pressurized fluid into the closed circuit between the main pump 8 and the hydraulic motor 9. Here, the scavenging pressure limiting valve 26 is for example set to a value which is slightly lower than the pressure predefined to the pressure sensor 21.

The invention claimed is:

1. Hydraulic drive (2) having a main pump (8), which can be adjusted in terms of delivery volume and delivery direction, and having a hydraulic motor (9), which main pump (8) and hydraulic motor (9) are connected to one another in a closed circuit via pressure lines (10A, 10B), and having a charge pump (14, 15) for charging into the closed circuit and for supplying pressurized fluid to at least one controlling device (11, 12), characterized in that the charge pump (15) has a separate drive motor (19) whose power/rotational speed can be specified independently of the rotational speed of a drive (3) of the main pump (8);

a temperature sensor for the temperature of the pressurized fluid is provided, which temperature sensor is connected via a signal line to the electronics (4) for controlling the rotational speed of the drive motor (19) of the charge pump (15).

2. Hydraulic drive according to claim 1, characterized in that the drive motor (19) is an electric motor.

3. Hydraulic drive according to claim 2, characterized in that the electric motor can be controlled/regulated in terms of rotational speed and is connected to electronics (4) for control.

4. Hydraulic drive according to claim 3, characterized in that a pressure sensor (21) for the charge pressure is arranged at the outlet of the charge pump (15), which pressure sensor (21) is connected to the electronics (4).

5. Hydraulic drive according to claim 4, characterized in that the pressure sensor (21) is arranged upstream of a purge valve (23).

6. Hydraulic drive according to claim 1, characterized in that the hydraulic motor (9) is a variable displacement motor with a controlling device (12) connected to electronics (4).

7. Hydraulic drive according to claim 6, characterized in that the electronics (4) for controlling the drive motor (19) of the charge pump (15) also control a traction drive (1) by means of the controlling device (12).

8. Hydraulic drive according to claim 1, characterized in that the charge pump (15) is an external gear pump, internal gear pump, gerotor pump, roller vane pump, vane-type pump or axial piston pump.

9. Hydraulic drive according to claim 1, characterized in that the charge pump (15) is adjustable in terms of delivery volume.

10. The hydraulic drive according to claim 1 wherein when the temperature of the pressurized fluid exceeds a predetermined value the drive motor (19) of the charge pump (15) is activated.

11. The hydraulic drive according to claim 1 wherein when the temperature of the pressurized fluid exceeds a predetermined value the drive motor (19) of the charge pump (15) is activated causing oil exchange in the hydraulic drive (2) which cools the pressurized fluid.

* * * * *